United States Patent
Barlow et al.

(10) Patent No.: US 8,285,975 B2
(45) Date of Patent: Oct. 9, 2012

(54) REGISTER FILE WITH SEPARATE REGISTERS FOR COMPILER CODE AND LOW LEVEL CODE

(75) Inventors: Stephen Barlow, Cambridge (GB); Neil Bailey, Cambridge (GB); Timothy Ramsdale, Cambridge (GB); David Plowman, Essex (GB); Robert Swann, Cambridge (GB)

(73) Assignee: Broadcom Europe Limited (GB)

( * ) Notice: Subject to any disclaimer, the term of this patent is extended or adjusted under 35 U.S.C. 154(b) by 1822 days.

(21) Appl. No.: 10/413,488

(22) Filed: Apr. 15, 2003

(65) Prior Publication Data

US 2004/0015682 A1 Jan. 22, 2004

(30) Foreign Application Priority Data

Apr. 15, 2002 (GB) .................................. 0208611.4

(51) Int. Cl.
*G06F 9/30* (2006.01)

(52) U.S. Cl. ...................................................... 712/228

(58) Field of Classification Search .............. 712/3, 228
See application file for complete search history.

(56) References Cited

U.S. PATENT DOCUMENTS

| | | | | |
|---|---|---|---|---|
| 4,133,028 A * | 1/1979 | Bernstein | .................. | 710/104 |
| 5,600,818 A * | 2/1997 | Weikmann | .................. | 711/163 |
| 5,717,933 A * | 2/1998 | Mann | .................. | 710/262 |
| 5,987,258 A * | 11/1999 | Daniel et al. | .................. | 717/124 |
| 6,016,395 A * | 1/2000 | Mohamed | .................. | 717/149 |
| 6,108,744 A * | 8/2000 | Lebee | .................. | 710/266 |
| 6,173,366 B1 * | 1/2001 | Thayer et al. | .................. | 711/129 |
| 6,314,511 B2 * | 11/2001 | Levy et al. | .................. | 712/217 |
| 6,530,011 B1 * | 3/2003 | Choquette | .................. | 712/3 |
| 6,665,774 B2 * | 12/2003 | Faanes et al. | .................. | 711/118 |
| 6,795,908 B1 * | 9/2004 | Lee et al. | .................. | 712/4 |
| 6,807,620 B1 * | 10/2004 | Suzuoki et al. | .................. | 712/2 |
| 2003/0046516 A1 * | 3/2003 | Cho | .................. | 712/209 |

OTHER PUBLICATIONS

Mann, Daniel. "Programming the 29K RISC family" PTR Prentice-Hall, Inc. 1994.*

Hamacher, V. Carl, Vranesic, Zvonko G., Zaky, Safwat G. "Computer Organization" McGraw-Hill Book Company. $2^{nd}$ Edition 1984. pp. 440-447.*

Hennessy, John L., Patterson, David A. "Computer Organization and Design: The Hardware/Software Interface" Morgan Kaufmann Publishers, Inc., 1998, 2nd Edition, pp. 351-377.*

* cited by examiner

*Primary Examiner* — Jacob A Petranek
(74) *Attorney, Agent, or Firm* — Brinks Hofer Gilson & Lione (57) ABSTRACT

A processor core comprising an execution unit and a register file, said register file comprising a first plurality of registers accessible to a compiler generated code and a second plurality of registers which can not be accessed by a compiler generated code, whereby the registers of said second plurality of registers are accessible to a low level code.

12 Claims, 7 Drawing Sheets

| Bit | Field | | |
|---|---|---|---|
| 32 | Rb_V | Immed(0) | |
| 33 | Rb_USX | Immed(1) | |
| 34 | Rb_XY(0) | Immed(2) | |
| 35 | Rb_XY(1) | Immed(3) | |
| 36 | Rb_XY(2) | Immed(4) | |
| 37 | Rb_XY(3) | Immed(5) | If Rb IMM = 1 |
| 38 | Rb_X(4) | Cond(0) | |
| 39 | Rb_X(5) | Cond(1) | |
| 40 | Rb_Y(4) | Cond(2) | |
| 41 | Rb_Y(5) | SETF | |
| 42 | Rb_IMM | | |
| 43 | Ra_XY(0) | | |
| 44 | Ra_XY(1) | | |
| 45 | Ra_XY(2) | | |
| 46 | Ra_XY(3) | | |
| 47 | Ra_X(4) | | |

Half-word 2

| Bit | Field |
|---|---|
| 16 | Ra_X(5) |
| 17 | Ra_Y(4) |
| 18 | Ra_Y(5) |
| 19 | Ra_USX |
| 20 | Ra_V |
| 21 | Rdab_SX(0) |
| 22 | Rdab_SX(1) |
| 23 | Rdab_SX(2) |
| 24 | Rd_XY(0) |
| 25 | Rd_XY(1) |
| 26 | Rd_XY(2) |
| 27 | Rd_XY(3) |
| 28 | Rd_X(4) |
| 29 | Rd_X(5) |
| 30 | Rd_Y(4) |
| 31 | Rd_Y(5) |

Half-word 1

| Bit | Field |
|---|---|
| 0 | Rd_USX |
| 1 | Rdab_16BI |
| 2 | Rd_V |
| 3 | I(0) |
| 4 | I(1) |
| 5 | I(2) |
| 6 | I(3) |
| 7 | I(4) |
| 8 | I(5) |
| 9 | CMPT=1 |
| 10 | 0 |
| 11 | 0 |
| 12 | 0 |
| 13 | 0 |
| 14 | 0 |
| 15 | 0 |

Compact 48-bit Encoding — Half-word 0

FIG. 7(I)

| Bit | Field | | |
|---|---|---|---|
| 32 | Rb_V | Immed(0) | |
| 33 | Rb_CIRC | Immed(1) | |
| 34 | Rb_XY(0) | Immed(2) | |
| 35 | Rb_XY(1) | Immed(3) | |
| 36 | Rb_XY(2) | Immed(4) | If Rb_IMM = 1 |
| 37 | Rb_XY(3) | Immed(5) | or Rb_IMM2 = 1 |
| 38 | Rb_X(4) | Immed(6) | |
| 39 | Rb_X(5) | Immed(7) | |
| 40 | Rb_Y(4) | Immed(8) | |
| 41 | Rb_Y(5) | Immed(9) | |
| 42 | Rb_IMM | | |
| 43 | Ra_XY(0) | | |
| 44 | Ra_XY(1) | | |
| 45 | Ra_XY(2) | Ra_X(2) | If Ra_SP = 1 |
| 46 | Ra_XY(3) | Ra_X(3) | |
| 47 | Ra_X(4) | | |
| 16 | Ra_X(5) | | |
| 17 | Ra_Y(4) | | |
| 18 | Ra_Y(5) | | |
| 19 | Ra_CIRC | | |
| 20 | Ra_V | SETF | |
| 21 | Rd_SX(0) | | If Ra_SP = 1 |
| 22 | Rd_SX(1) | | |
| 23 | Rd_SX(2) | | |
| 24 | Rd_XY(0) | | |
| 25 | Rd_XY(1) | | |
| 26 | Rd_XY(2) | | |
| 27 | Rd_XY(3) | | |
| 28 | Rd_X(4) | | |
| 29 | Rd_X(5) | | |
| 30 | Rd_Y(4) | | |
| 31 | Rd_Y(5) | | |
| 0 | Rd_CIRC | | |
| 1 | Rd_16BIT | | |
| 2 | Rd_V | | |
| 3 | I(0) | | |
| 4 | I(1) | | |
| 5 | I(2) | | |
| 6 | I(3) | | |
| 7 | I(4) | | |
| 8 | I(5) | | |
| 9 | CMPT=0 | | |
| 10 | 0 | | |
| 11 | 0 | | |
| 12 | 0 | | |
| 13 | 0 | | |
| 14 | 0 | | |
| 15 | 0 | | |

Half-word 2 (bits 32–47), Half-word 1 (bits 16–31), Half-word 0 (bits 0–15). Full 80-bit Encoding.

FIG. 7(II)

| | |
|---|---|
| 64 | SRU_SX(0) |
| 65 | SRU_SX(1) |
| 66 | SRU_SX(2) |
| 67 | SRU(0) |
| 68 | SRU(1) |
| 69 | Rep(0) |
| 70 | Rep(1) |
| 71 | Rep(2) |
| 72 | REPLT |
| 73 | ACC |
| 74 | CLRA |
| 75 | Cond(0) |
| 76 | Cond(1) |
| 77 | Cond(2) |
| 78 | SETF |
| 79 | - |

Half-word 4

| | | |
|---|---|---|
| 48 | Rd_++ | |
| 49 | Ra_SX(0) | |
| 50 | Ra_SX(1) | |
| 51 | Ra_SX(2) | |
| 52 | Ra_x++ | |
| 53 | Ra_Y(0) | |
| 54 | Ra_Y(1) | |
| 55 | Ra_y++ | Ra_Y(2) |
| 56 | Ra_16BIT | Ra_Y(3) |
| 57 | Ra_SP | |
| 58 | Rb_++ | Immed(10) |
| 59 | Rb_16BIT | Immed(11) |
| 60 | Rb_SX(0) | Immed(12) |
| 61 | Rb_SX(1) | Immed(13) |
| 62 | Rb_SX(2) | Immed(14) |
| 63 | Rb_IMM2 | Immed(15) |

Half-word 3

If Ra_SP = 1

If Rb_IMM = 1 or Rb_IMM2 = 1

If Rb_IMM = 1

FIG. 7(III)

REGISTER FILE WITH SEPARATE REGISTERS FOR COMPILER CODE AND LOW LEVEL CODE

FIELD OF THE INVENTION

The present invention relates to a processor and in particular, but not exclusively, to the allocation of registers in a processing core so that they are available exclusively for an applications program.

BACKGROUND OF THE INVENTION

It is increasingly the case that processors are being purpose built to fulfil the requirements of particular applications. The present invention concerns particularly, but not exclusively, a processor architecture for use in image processing or other multi-media applications.

Existing processor architectures use differing combinations of so-called scalar units and vector units. In the following, a scalar unit implies a unit capable of executing instructions defining a single operand set, that is, typically operating on a pair of source values and generating a destination value for each instruction. A vector unit operates in parallel on a plurality of value pairs to generate a plurality of results. These are often provided in the form of packed operands, that is two packed operands provide a plurality of value pairs, one from each operand in respective lanes.

Existing processor architectures use a scalar processor unit for multi-media processing. However, because there is little or no parallelism in this approach, the processor has to run very quickly. Even if the processor is capable of running quickly, it will be inefficient in terms of power consumption.

Other approaches have considered the coupling of a scalar processor with a vector processing unit. However, it is difficult to establish an architecture in which the advantages of the scalar unit and the vector processing unit can be maximised without placing restrictions on the processor operation. For example, if the vector unit is a separate processor it is difficult to achieve sufficiently tight integration to enable the scalar unit and the vector unit to work efficiently together. Alternatively, if the vector unit is part of the same processor as the scalar unit, it is difficult to construct a unit with sufficient parallelism but which can communicate intelligently enough with the scalar unit. It is also difficult for the scalar unit to keep the vector unit fed with enough data to achieve significant performance gains.

It is an aim of the present invention to overcome or at least mitigate such problems.

SUMMARY OF THE INVENTION

According to one aspect of the present invention there is provided a processor core comprising an execution unit and a register file, said register file comprising; a first plurality of registers accessible to a compiler generated code; and a second plurality of registers which can not be accessed by a compiler generated code; whereby the registers of said second plurality of registers are accessible to a low level code.

Another aspect of the invention provides a method of allocating registers in a processing core comprising an execution unit and a register file having a plurality of registers, each register being identifiable by an associated register number, the method comprising: reserving a set of said registers such that when a program is compiled in a compiler, said reserved register numbers are not visible to the compiler, whereby they are available exclusively for an applications program.

BRIEF DESCRIPTION OF THE DRAWINGS

For a better understanding of the present invention, and to show how the same may be carried into effect, reference will now be made by way of example to the accompanying drawings, in which:

FIGS. 7(I), 7(II) and 7(III) illustrate 48 bit and 80-bit encodings of vector instruction.

DETAILED DESCRIPTION OF THE INVENTION

In the description like reference numerals refer to like parts.

Figure 1:
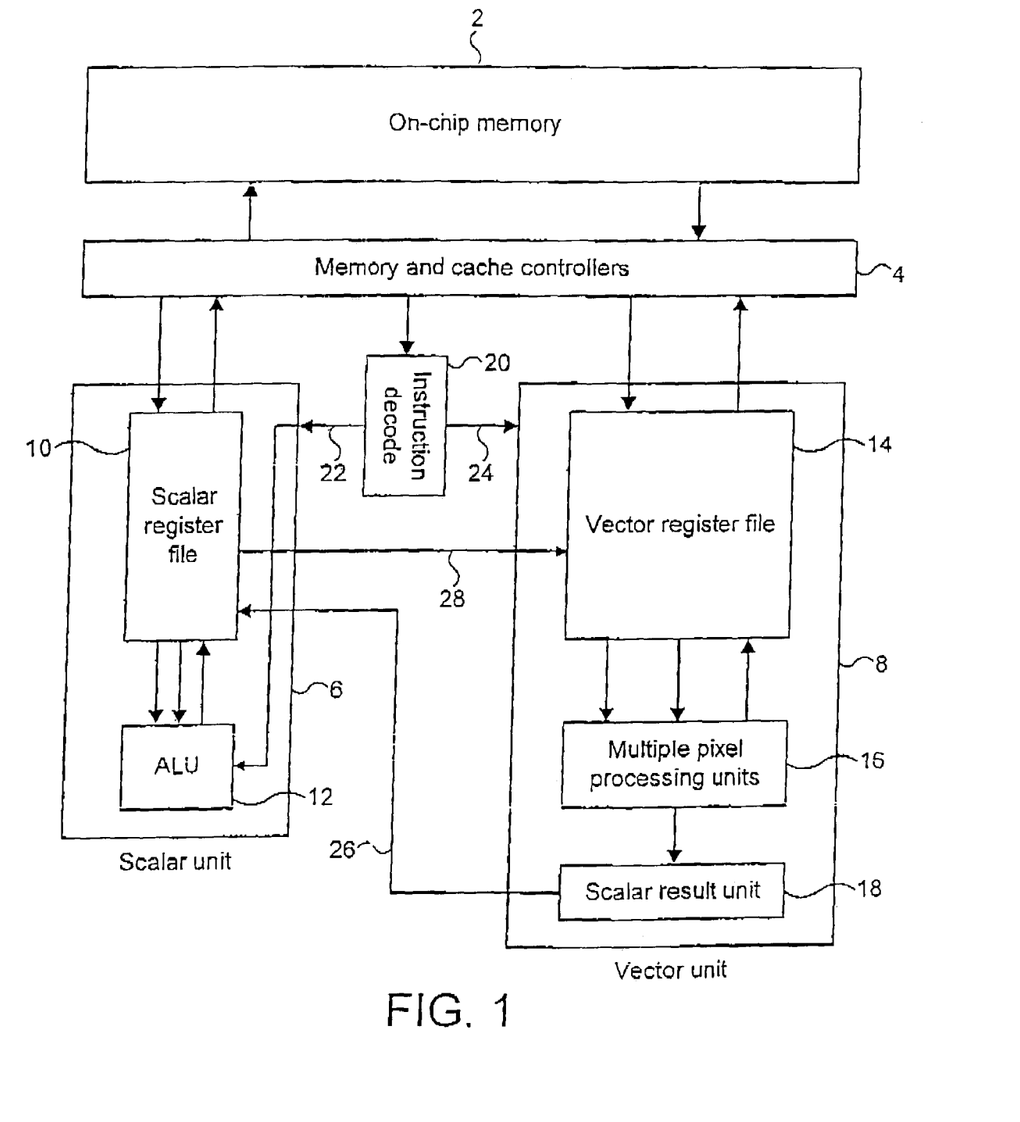
FIG. 1 is a schematic block diagram of the processor architecture.

FIG. 1 is a schematic block diagram of a processor in accordance with one embodiment of the invention. An on-chip memory 2 holds instructions and data for operation of the processor. Memory and cache controllers denoted generally by a block 4 control communication of instructions and data from the on-chip memory with the two main processing units of the processor. The first main processing unit 6 is a scalar unit and the second main processing unit 8 is a vector unit. In brief, the scalar unit 6 comprises a scalar register file 10 and an ALU processing block 12. The vector unit 8 comprises a vector register file 14, a plurality of pixel processing units (PPU) denoted generally by a block 16 and scalar result unit 18. An instruction decoder 20 receives a stream of instructions from the on-chip memory 2 via the memory and cache controllers 4. As will be discussed in more detail hereinafter, the instruction stream comprises distinct scalar and vector instructions which are sorted by the instruction decoder 20 and supplied along respective instruction paths 22, 24 to the scalar unit and to the vector unit depending on the instruction encoding. The results generated by the vector unit, in particular in the scalar result unit 18, are available to the scalar register file as denoted by arrow 26. The contents of the scalar register file are available to the vector register file as indicated diagrammatically by arrow 28.

FIG. 1 is a schematic view only, as will be apparent from the more detailed discussion which follows. In particular, the processor includes an instruction cache and a data cache which are not shown in FIG. 1 but which are shown in subsequent figures. Moreover, the instruction decoder 20 (as described later) in fact lies within the scalar unit.

Before discussing the detail of the processor architecture, the principles by which it operates will be explained.

The scalar and vector units 6, 8 share a single instruction space with distinct scalar and vector instruction encodings. This allows both units to share a single instruction pipeline, effectively residing in the instruction decoder 20 (implemented as a control and instruction decode module in the scalar unit). Instructions are dispatched sequentially to either the scalar unit 6 (in fact to the ALU processing unit 12 of the scalar unit 6) or to the vector unit 8, depending on their encodings, where they run to completion as single atomic units. That is, the control and instruction decode module 20 within the scalar unit 6 wait for the previous instruction to complete before issuing a new instruction, even if the relevant unit is available to execute the new instruction.

The scalar unit 6 and vector unit 8 operate independently. However, communication between the two units is available because of the following two facets of the processor architecture. Both units can read and write data in the main on-chip memory 2. In addition, the vector unit can use registers in the register file 10, immediate values (fixed values defined in an instruction) and main memory accesses using values held in the scalar register file 10. The result of a vector operation in the vector unit 8 can then be written back into one of these scalar registers from the scalar result unit 18.

Figure 2:
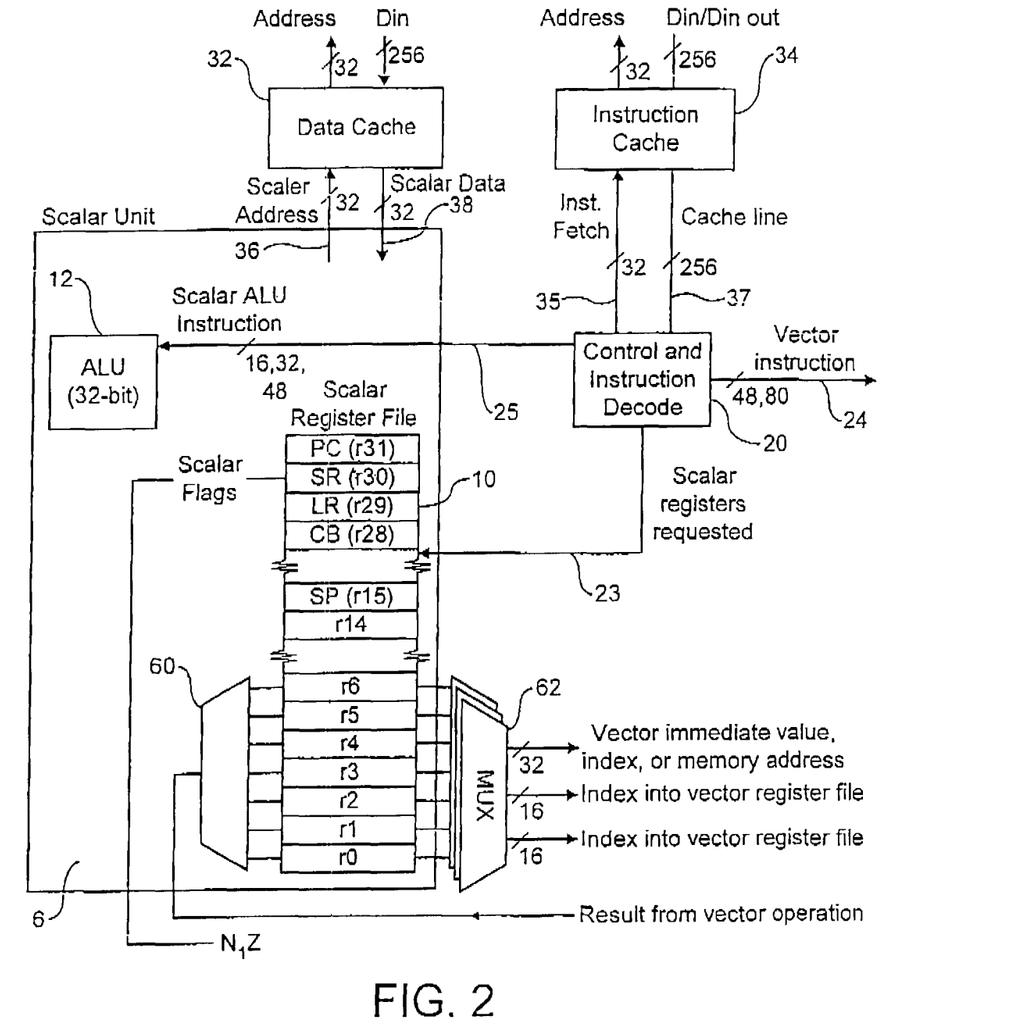
FIG. 2 is a schematic diagram of the scalar unit.

The scalar unit will now be described with reference to FIG. 2. Au mentioned above, the instruction decoder 20 is implemented as a control and instruction decode module within the scalar unit 6. The scalar unit communicates with an instruction cache 32 and a data cache 34 in a conventional fashion. In particular, the control and instruction decode module 20 issues instruction fetches along bus 36 and receives instructions along instruction cache line 38. A 256-bit sequence is received along cache line 38 for each instruction fetch, the number of instructions in each fetch depending on their encodings. Scalar addresses are supplied to the data cache 34 via bus 35 and data returned along bus 37. The control and instruction decode module 20 supplies scalar instructions along path 23 to the ALU block 12 and vector instructions to the vector unit 8 along instruction path 24. The decision as to where to route an instruction is based on the instruction encodings as will be discussed in more detail in the following.

The scalar unit 6 also incorporates a scalar register file. There are thirty two 32-bit registers which are labelled $r_0 \ldots r_{31}$ in the scalar register file 10. The bottom sixteen registers $r_0$ to $r_{15}$ form the main working registers of the processor, accessible by all but a few specialised instructions. A subset of these working registers, the so-called core registers labelled $r_0$ to $r_6$, are available to the vector unit 8. These registers can be used to hold an immediate value, as an index into the vector register file, as an address for vector memory accesses or for storing results of vector operations.

The top 16 registers are less visible, being only accessible by the eight most frequently used instructions, and the single register operand instructions. Restricting the visibility of the top 16 registers allows a 16-bit encoding for scalar instructions to be adopted to achieve superior code compaction. Registers $r_{14} \ldots r_{31}$ are referred to as extended registers and include most of the dedicated function registers that are discussed below.

Registers $r_{15}$ and $r_{28} \ldots r_{31}$ perform dedicated functions some of which are described below.

Register $r_{31}$ is the program counter (PC), which points to the address of the current instruction and thus is used to control instruction fetches.

Register $r_{30}$ constitutes the status register, which contains condition codes, low power at sleep and global interrupt enable bits.

Register $r_{29}$ operates as the link register. A branch to subroutine instruction automatically stores the program count for the next instruction into the link register to allow for efficient returns from sub-routines. Otherwise it is free for general use.

Register $r_{28}$ is reserved for use for communication with the vector unit.

The Stack Pointer Register $r_{15}$ is used to hold addresses to which interrupts will automatically save state information.

As far as the compiler of any particular program which is to run on the processor architecture described herein is concerned, it can adopt the following register usage scheme.

Registers $r_0 \ldots r_{15}$ are used as working registers by the compiler, with register $r_{15}$ reserved for the stack pointer and register $r_{14}$ for the static data global pointer. Any assembly level code that uses any of these registers must first preserve them on the stack and then restore them from the stack after use, ensuring that the stack remains covered at all times.

As already mentioned above, the top four registers $r_{28}$ to $r_{31}$ serve special functions within the scalar unit. Aside from these special function registers, registers $r_{16}$ to $r_{27}$ remain outside the scope of the compiler and as such are not used in codes generated in C, which is to be compiled by the C compiler. Registers $r_{24}$ to $r_{27}$ can therefore be informally reserved for real time operating system usage, although the programmer can re-assign them if so desired, which leaves registers $r_{16}$ to $r_{23}$ free for low level assembly use.

The scalar unit 6 runs on a set of scalar instructions which uses standard encoding of 16-bits, with 32 hit and 48 bit variants decoded for large immediate and offset values. The vector unit runs on vector instructions, which are optionally encoded in 48 or 80 bit forms.

The instructions are grouped according to their register usage. That is, there are three groups labelled Group 1, Group 2 and Group 3.

Group 1 instructions comprises general purpose and single register scalar instructions which operate over the full register range, reading and writing to any of the scalar registers $r_0$ to $r_{30}$. Note that to simplify the control logic and avoid future pipeline constraints, the program counter PC ($r_{31}$) is only accessible to move and branch instructions. Instructions that fall into this group are:

| | | | | | |
|---|---|---|---|---|---|
| btest | Rd,#u5 | | add | Rd,Ra | |
| bmask | Rd,#u5 | sub | Rd,Ra | | |
| mov | Rd,#u32 | | and | Rd,Ra | |
| cmp | Rd,#s18 | | or | Rd,Ra | |
| add | Rd,#s18 | | asr | Rd,Ra | |
| sub | Rd,#b3 | shl | Rd,Ra | | |
| asr | Rd,#u5 | cmp | Rd,Ra | | |
| shl | Rd,#u5 | mov | Rd,Ra | | |
| brev | Rd | | mov | Rd,pc | |
| count | Rd | | b | Ra | (mov pc,Ra) |
| abs | Rd | | | | |
| Rd,Ra = r0 . . . r30 | | | | | |

Group 2 instructions operate on the so-called working registers $r_0$ to $r_{15}$ of the register file 10. The instructions that tall into this category are:

| | | | |
|---|---|---|---|
| addc | Rd,Ra | mul | Rd,Ra |
| subc | Rd,Ra | max | Rd,Ra |
| rsub | Rd,Ra | min | Rd,Ra |
| neg | Rd,Ra | ld | Rd, (Ra) |
| eor | Rd,Ra | st | Rd, (Ra) |
| not | Rd,Ra | ld | Rd, ([--Ra/Ra++]) |
| lsr | Rd,Ra | st | Rd, ([--Ra/Ra++]) |
| ror | Rd,Ra | mla | r0,Ra,Rb |
| btest | Rd,Ra | addscale | Rd,Ra shl #n2 |
| bmask | Rd,Ra. | signextb | Rd,Ra |
| | | signexth | Rd,Ra |
| | | addcmpbCond | Rd, [Ra/#s4 [,Rb, #s10h |
| | | addcmpbCond | Rd, [Ra/#s4] ,#u6, #s8h |
| Rd,Ra,Rb = r0 . . . r15 | | | |

Group 3 instructions comprises the least frequently used instructions which operate only on the so-called core registers $r_0$ to $r_6$. The instructions that fall into this category are:

| add | Rd,Ra,Rb | mulhd.ss | Rd,Ra |
|---|---|---|---|
| sub | Rd,Ra,Rb | mulhd.su | Rd,Ra |
| asr | Rd,Ra,Rb | mulhd.us | Rd,Ra |
| shl | Rd,Ra,Rb | mulhd.uu | Rd,Ra |
| Rd,Rb,Ra = r0 . . . r6 | | | |

Figure 3:
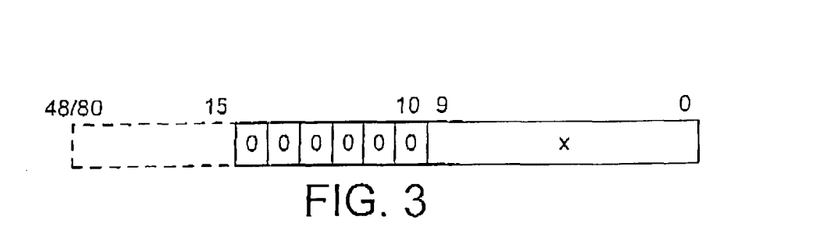
FIG. 3 illustrates bits 0 to 15 of a vector instruction.

FIG. 3 illustrates bit 0 to 16 of a vector instruction of particular importance it is to be noted that the 6-bit sequence 000000 in bit 10 to 15 of the instruction indicate that the instruction is not a scalar instruction but is in fact a vector instruction. This allows the instruction decoder 20 to distinguish between scalar instructions and vector instructions.

The register allocation is thus determined not so much at a structural level, but at the encoding level. Part of a program is written in 'C' and then complied to generate compiled code which is supplied to an assembler. In the C program the "reserved" registers are not used. This is something that is controlled by the compiler.

In this way the registers are "reserved" not by any physical features of the processor, but merely by the conventions by which it is used. These are enforced throughout all the software that is used with/for the processor One such example is the C compiler. The compiler has to be designed in such a way that it never tries to use the "reserved" registers.

The assembler also receives assembly level code written by an applications programmer. This assembly level code can use the reserved registers when it is written.

In general a program consists of C code (being used for the "bulk" of the program) which has to be compiled with the C compiler, and hand-written assembly code (for the most important "performance critical" parts). The assembly programmer can then use the "reserved" registers as they wish to improve performance, safe in the knowledge that the compiler will never touch them. For example performance improvements will be possible because values will already be in registers, and there will be no need to load them at the start of every function, and then to store them again at the end.

If, two or more difference assembly programs have to work together there should be a prior process of negotiation. Assembly programmers will have to agree, for example that $r_{17}$ and $r_{18}$ will be used in one piece of assembly code and $r_{19}$ and $r_{20}$ will be used for another.

The vector unit 8 will now be described with reference to FIG. 4. The vector unit comprises sixteen 16 bit pixel processing units SPUD . . . PPU$_0$ . . . PPU$_{15}$ which operate in parallel on two sets of sixteen values. These sets of values can be returned as packed operands from the vector register file 14, from the scalar register file 10 or from the main memory 2. The results of the PPU operations are handled as described later.

The detail of the vector register file 14 is not germane to the present invention and therefore is not described in detail herein. However, it is to be noted that groups of sixteen contiguous pixels are written or read at once, each pixel value being represented by a 16-bit sequence.

Figure 5:
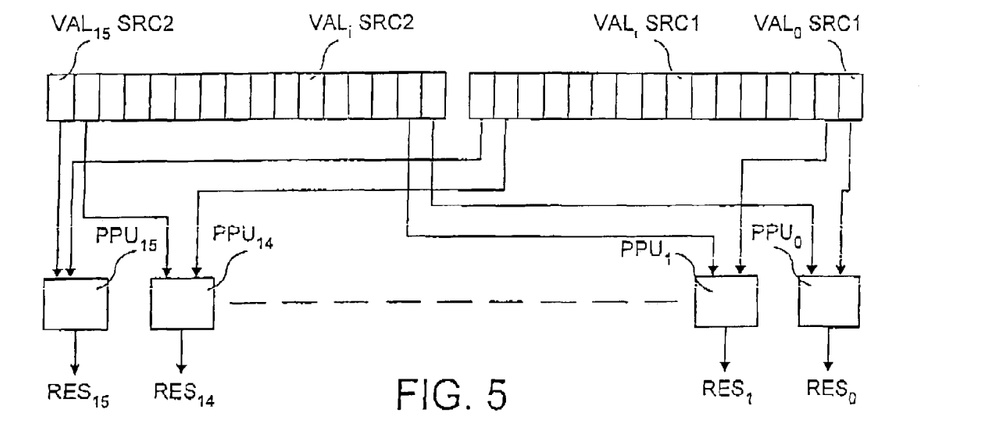
FIG. 5 is a schematic diagram illustrating parallel operation of multiple pixel processing units in the vector unit.

As illustrated in FIG. 5, each pixel processing unit PPUi acts on two values, When the processor is a graphics processor, each value relates to a pixel. The vector instructions supply two operands to the pixel processing unit. These are labelled SRC1, denoting a first packed operand and SRC2, denoting a second packed operand in FIG. 5. Each operand comprises a plurality of values, in the described embodiment sixteen 16-bit values. A value from each operand is supplied to each pixel processing unit 16, such that PPUi operates on the ith element of the 16 element factors (operands) that have been processed simultaneously. An individual result is generated by each pixel processing unit, the result being labelled RESi in FIG. 5.

The pixel processing units PPU$_0$ . . . PPU$_{15}$ will now be described with reference to FIG. 6. Each of the pixel processing units contains an ALU 50 which operates on two input 16-bit values VAL; SRC1, VAL; SRC2 supplied along paths 52, 54 respectively, to port A and port Op2 to create a single output value RES$_{out}$, according to the operation that has been selected by the vector instruction. Each pixel processing unit 16 has Z, N and C flags denoted generally by the flag block 56. The Z flag denotes a zero flag, the N flag denotes a negative flag and the C flag is a carry flag. The function of these flags is not germane to this invention and is not described further herein. Each pixel processing unit includes an adder 58 and an accumulator 59, which allow the result of the ALU operation to be accumulated and then returned. The thus accumulated value is denoted $V_{acc}$. The output of each pixel processing unit 16 is supplied at port D to the vector register file and to the scalar result unit 18.

The scalar result unit 18 operates on the outputs of the pixel processing unit 16, depending on the operation defined in the vector instruction supplied to the vector unit. This value is then written back to the scalar register file 10 in the scalar unit 6 and the scalar flags N, Z are updated according to it. A demultiplexer 60 (FIG. 4) in the scalar unit 6 writes the value to the correct one of the core registers $r_0$ . . . $r_6$. Likewise, a set of multiplexers 62 supply the outputs of the core registers $r_0$ . . . $r_6$ to the vector register file via address calculation logic 64 according to whether the value is a vector immediate value, index or memory address of 32 bits, or respective 16 bit indices into the vector register file.

Values can be supplied to the pixel processing units 16 in a number of different ways. The use of a 16 bit index creates an address via address calculation logic 64A into the vector register file into the port marked A$_{addr}$. This causes data held in the vector register file to be supplied to the pixel processing units 16 into port A along path 52 in FIGS. 4 and 5. Data can also be accessed from port B by using an index which has created an address for the vector register file into the port marked B$_{addr}$.

This data can be supplied to the port Op2 of the pixel processing unit 16 via a multiplexer 64. Multiplexer 64 also allows for data to be accessed directly from the scalar register file 10 by taking a value held in one of the core registers $r_0$ . . . $r_6$ and supplying it through a replicate unit 66, which replicates at 16 times.

Figure 4:
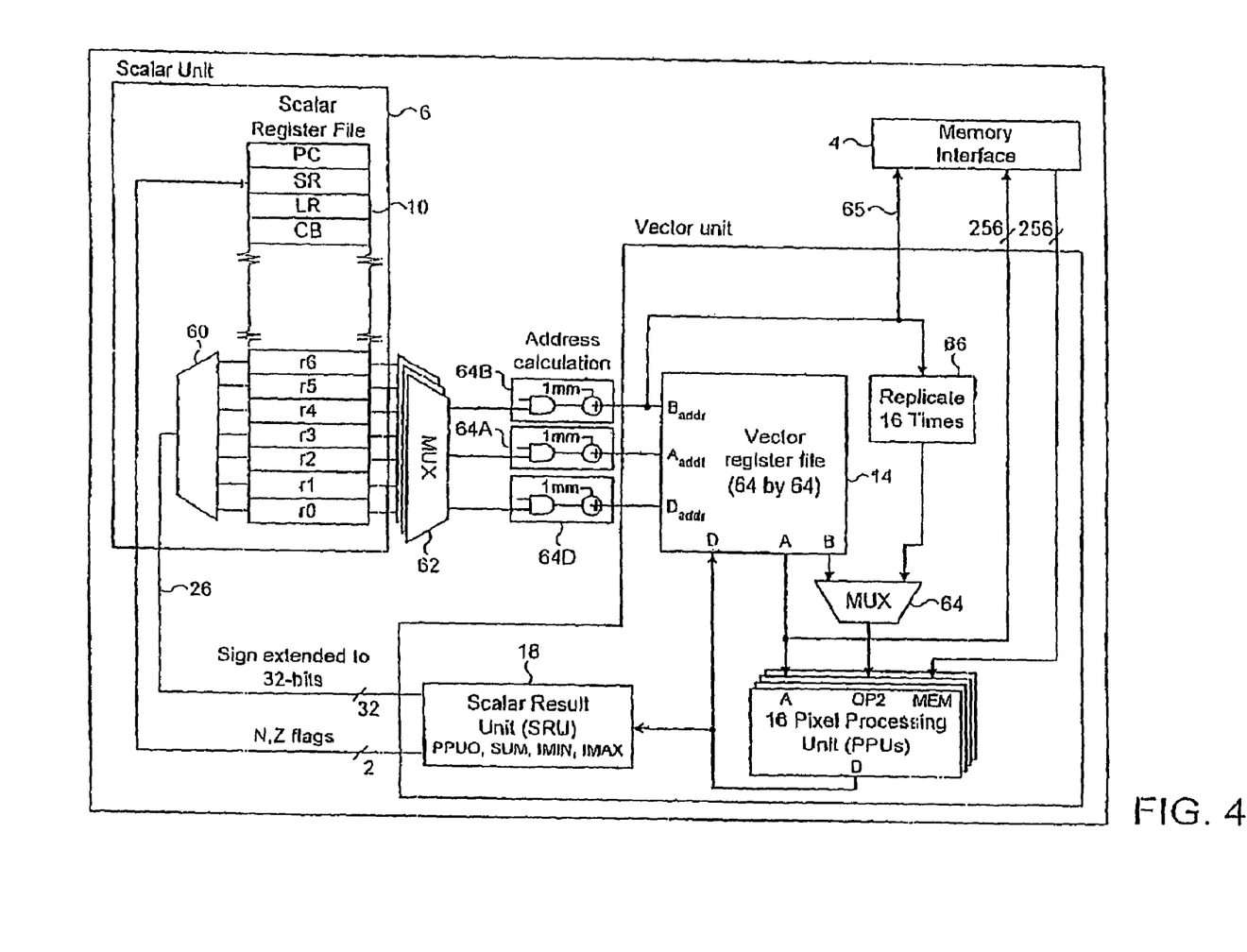
FIG. 4 is a schematic block diagram of a vector unit.

An alternative supply of data to the pixel processing unit 16 is directly from on-chip memory 2 via the memory interface 4 (FIG. 4). In this case, an address calculated by address calculation logic 64B is used as an address into main memory along address bus 65, and data access thereby is supplied to port MEM of the pixel processing unit.

The replicate unit 66 can also act on an immediate value in a vector instruction as well as on the contents of a core register in the scalar register file 10.

Figure 6:
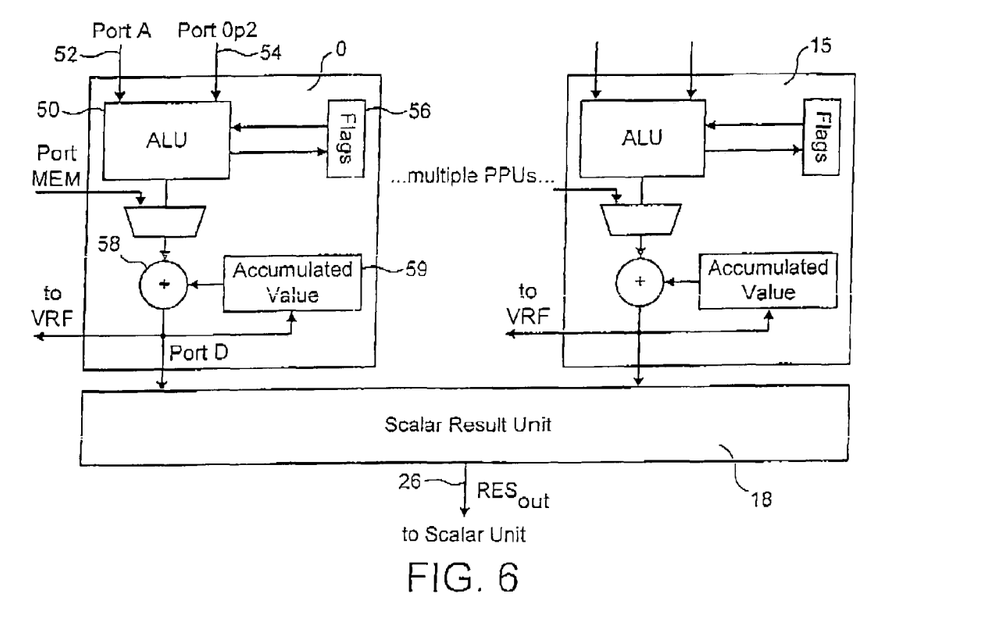
FIG. 6 is a schematic diagram illustrating the internal circuitry of pixel processing units.
Figure 7:
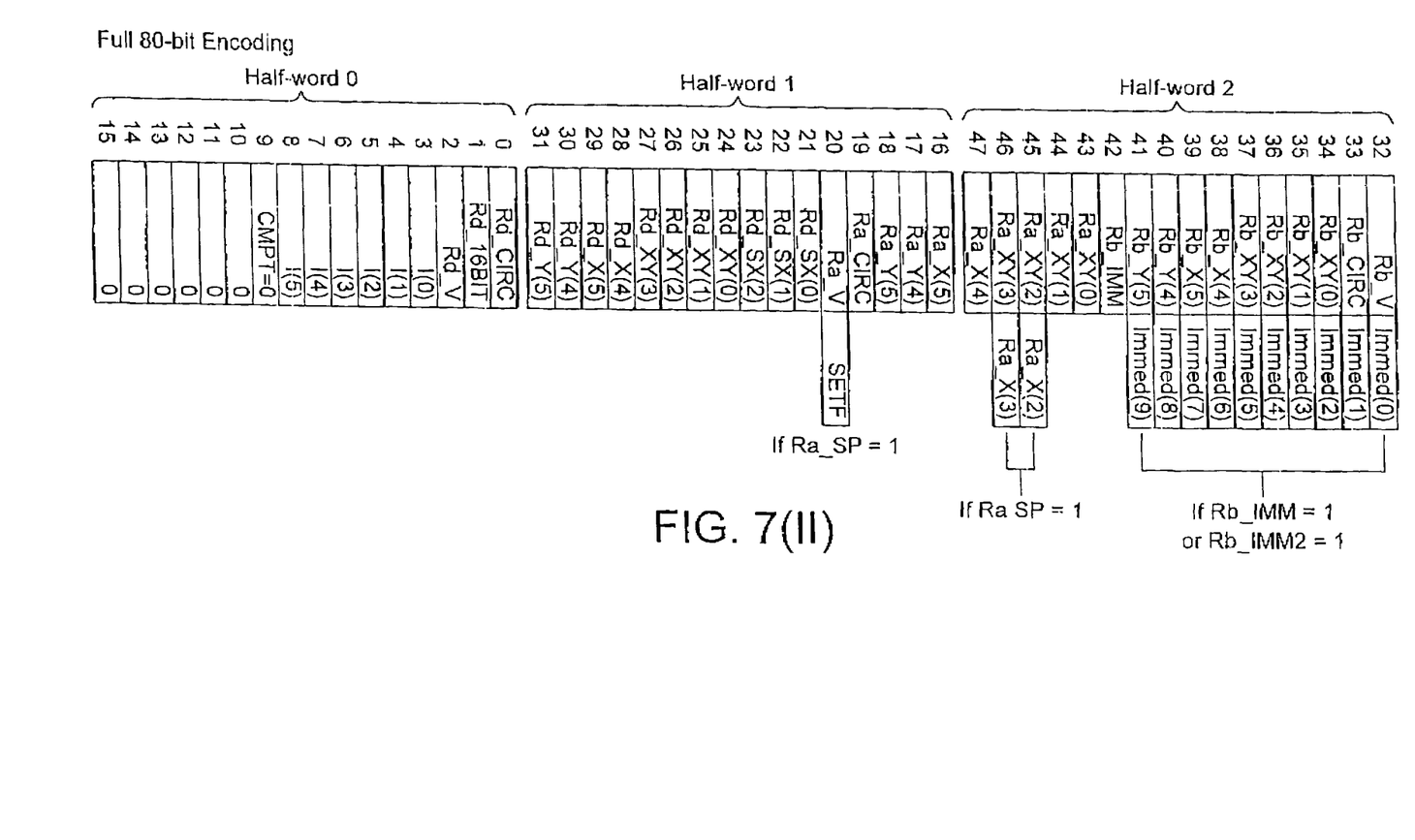
Figure 7I:
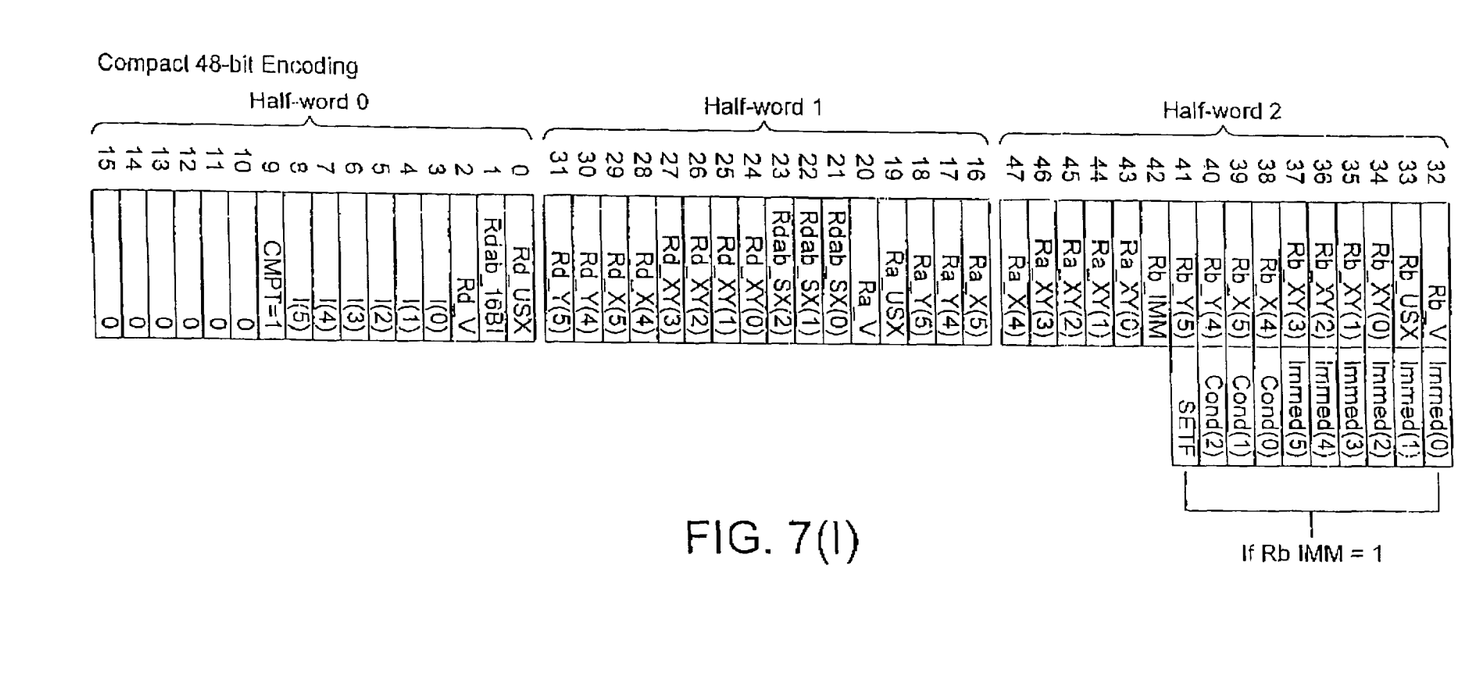

From this discussion it will be appreciated that the input labelled 54 in FIG. 6 to the pixel processing units can supply either values from the vector register file, values from the scalar register file or values directly from memory to the ALU.

With a small number of exceptions, almost all vector instructions have a general three operand form:
<operation>R(yd,xd), R(ya,xa), Op2 [<modifiers>]
where operation is the name of the operation to be performed, and registers in the vector register file are generically denoted R(y,x) due to the addressing semantics of the vector register file (not discussed herein). In the above example R(yd,xd) is the destination register, R(ya,xa) is the first source register and Op2 may indicate a second source register R(yb,xb), or a value taken from one of the scalar registers $r_0$ to $r_6$, or an immediate value (these latter two being repeated identically across all sixteen PPUs), as explained above. Finally <modifiers> are selected from an optional list of instruction modifiers which control how the PPUs 16 and the scalar result unit handle the results of the ALU operations in each PPU. The following description discusses a modifier which affects the PPUs and modifiers which affect the scalar result unit.

Once such modifier affecting the PPU is the "accumulate" modifier ACC. This modifier instructs the pixel processing unit 16 to add the result of the ALU operation to the current value of the accumulator 59. This addition is always performed using 16 bit signed saturating arithmetic. When the "accumulate" modifier ACC is specified, then the accumulated value, not the output of the ALU, becomes the final output read by the pixel processing unit. This means that the accumulated value will be written back to the destination register at port D.

The vector instructions operate on the pixel processing unit 16 in the following way:

Each of the sixteen pixel processing units is presented with two 16-bit values, one derived from R(ya,xa) and one derived from Op2. (Note that if 8-bit values are read from the vector register file then these are zero extended into 16-bit values.)

Each pixel processing unit performs its operation in accordance with the nature of the operation defined in the instruction. The operation is executed by the ALU 50. If an instruction modifier specifies accumulation of the results, then this takes place. In this case the accumulated values are returned as the final output values of the pixel processing units 16, otherwise the output of the ALU operation is returned as the final output of the pixel processing unit.

The scalar result unit 18 performs any calculations indicated by modifiers. The scalar result unit operates on the final outputs from the pixel processing units 16 and the result may be written to one of the scalar registers $r_0$ to $r_6$, and the scalar flags will be set accordingly. The final outputs of the pixel processing units are also written back to the vector register file at port D (in FIGS. 4 and 6).

The vector instruction set can be thought of as being constituted by four types of instructions:
 load/store instructions
 vmov (move instruction)
 data processing instructions
 look up instructions.

It is to be noted that in writing the program, all vector instructions are preceded by v to denote that they are vector instructions. In the encoding, bits 10 to 15 are set to zero so that the more common ones have a compact 48-bit encoding. By way of example, FIG. 5 illustrates the 80-bit encodings for data processing instructions of the following form including REPn and REPLT modifier bits.
<operation>R(yd,xd),R(ya,xa),Op2.

Note that all instructions contain six bits to hold opcode, identifying the nature of the instruction (bits 3 to 8 of Halfword 0, labelled I[0] to I[5]. These bits are supplied to each of the PPUs 16. Also note that bit 9 labelled CMPT is a flag which is set to one to indicate a compact 48-bit encoding and zero to indicate the full 80-bit encoding. The REP modifier bits are bits 69 to 72 of Half Word 4 in the 80b encoding.

The main categories of vector instructions are discussed below.

Load/Store Instructions
vld R(yd,xd), (rx+#immediate)
Load sixteen consecutive bytes or sixteen bit half words from memory into the vector register file.

The first set of the load/store instructions identify a destination register in the vector register file and identify a source operand by virtue of its address in main memory. Its address in main memory is calculated from the content of a register rx in the scalar register file 10 using the address calculation logic $64_B$ and the resulting operand is supplied to port MEM.

Another set of load/store instructions identify a set of operands in the vector register file and cause them to be stored back to memory at an address identified using the contents of a scalar register. The instruction has the following format:
vst R(ya,xa), (rx+#immediate).
Store sixteen consecutive bytes or half words from the VRF back to memory. The memory address is calculated using the address calculation logic $64_B$ as before.

In both cases, if R(y,x) denotes an 8-bit register, sixteen bytes are stored. If R(y,x) denotes a 16-bit register, half words are stored.

Move Instructions
vmov R(yd,xd), Op2
moves OP2 to R(yd,xd).

In this case, Op2 may be a value from a scalar rx, or an immediate value or an immediate value plus the value from a scalar register rx, or a VRF register R(yb,xb) accessed from port B in FIG. 4. In this case therefore there are a number of options for identifying the location of the source value, the destination location being identified in the vector register file.

Data Processing Instructions
All these instructions take the usual form;
<operation>R(yd,xd) R(ya,xa) Op2.
A number of different operations can be specified, including addition, subtraction, maximum, minimum, multiply, etc.

Look-up instructions are specialised instructions having the form:
vlookup R (yd,xd)
and are not discussed further herein. They allow access to the vector register file, the addressing semantics of which are not discussed further herein.

As mentioned above, the scalar result unit 18 can implement different operations as defined by modifiers in the vector instructions.

The SRU 18 calculates a 32-bit value from the 16 PPU outputs and writes this result back to one of the scalar registers r0 to r6, denoted by rx. The scalar unit N and Z flags are both updated by this process, with the C and V flags left unaffected. The modifiers that apply to the SRU are given in Table I.

TABLE I

| Modifier | Description |
| --- | --- |
| PPU0 rx | Place the output of $PPU_0$ into register rx |
| SUM rx | Sum all PPU outputs and place the result in rx |
| IMIN rx | Place the index (0 . . 15) of the minimum PPU output in rx |
| IMAX rx | Place the index (0 . . 15) of the maximum PPU output in rx |

PPU0

The output of the first PPU ($PPU_0$) is placed into scalar register rx, and the scalar flags updated accordingly.

SUM

All active PPUs are summed and the result placed in rx, updating the scalar flags accordingly. If no PPUs are selected, then the result is always zero.

IMIN

The index i (running from 0 to 15) of $PPU_i$ that contains the minimum value of any active PPUs is placed in rx, and the scalar flags updated. If no PPUs are active, then the result is −1. If two or more PPUs share the same minimum, the lowest valued index is returned.

IMAX

The index i of $PPU_i$ that contains the maximum value of any active PPUs is placed in rex, and the scalar flags updated. If no PPUs are active, then the result is −1. If two or more PPUs share the same maximum, the highest valued index is returned.

None of these SRU modifiers can be mixed with one another.

It is to be noted that while the above describes preferred embodiments of the invention, variations and modifications may be made without departing from the scope of the present invention.

The invention claimed is:

1. A processor core comprising:
   an execution unit for executing a plurality of instructions; and
   a register file comprising:
      a first plurality of registers accessible to the plurality of instructions; and
      a dedicated register, wherein only one opcode in the plurality of instructions is able to read from the dedicated register and write to the dedicated register.

2. The processor core as claimed in claim 1 wherein:
   each register in said first and second plurality of registers is allocated a respective register number identifying that register; and
   the processor core further comprises a memory for storing records of the register numbers identifying those registers that are accessible to the move and branch instructions.

3. The processor core as claimed in claim 1, wherein said first plurality of registers comprises working registers.

4. The processor core as claimed in claim 1, wherein said dedicated register comprises an extended register.

5. The processor core as claimed in claim 1, wherein the dedicated register stores an address associated with a future instruction.

6. The processor core as claimed in claim 1, wherein each register of said first and second plurality of registers is arranged to provide a storage location for data.

7. The processor core as claimed in claim 1, further comprising:
   a scalar processing unit for executing scalar instructions each defining a single value pair; and a vector processing unit for executing vector instructions.

8. The processor core as claimed in claim 1, wherein the processor core is a graphics processor.

9. The processor core as claimed in claim 1, further comprising:
   an instruction memory holding a program in the form of instructions including scalar instructions and vector instructions in a common instruction space.

10. The processor core as claimed in claim 1, further comprising:
    a data memory holding data values.

11. The processor core as claimed in claim 1, wherein the dedicated register is for use either by a systems or an application program.

12. A processor core comprising:
    a compiler for compiling instructions; and
    a register file having a plurality of registers, wherein one register in the plurality of registers is a dedicated register, and wherein only one opcode is able to read from the dedicated register and write to the dedicated register.

* * * * *